US007868129B2

(12) United States Patent
Windes et al.

(10) Patent No.: US 7,868,129 B2
(45) Date of Patent: *Jan. 11, 2011

(54) SLOPED TUBULAR REACTOR WITH SPACED SEQUENTIAL TRAYS

(75) Inventors: Larry Cates Windes, Kingsport, TN (US); Bruce Roger DeBruin, Lexington, SC (US); Michael Paul Ekart, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 618 days.

This patent is subject to a terminal disclaimer.

(21) Appl. No.: 11/776,587

(22) Filed: Jul. 12, 2007

(65) Prior Publication Data
US 2009/0016938 A1 Jan. 15, 2009

(51) Int. Cl.
C08G 63/00 (2006.01)
C08G 63/02 (2006.01)

(52) U.S. Cl. ............... 528/308.1; 422/129; 422/131; 422/137; 422/138; 526/64; 528/171; 528/176; 528/271; 528/272

(58) Field of Classification Search ........... 422/129, 422/131, 137, 138; 526/64; 528/171, 176, 528/271, 272, 308.1
See application file for complete search history.

(56) References Cited

U.S. PATENT DOCUMENTS

| 1,422,182 | A | 7/1922 | Curme |
|---|---|---|---|
| 2,361,717 | A | 10/1944 | Taylor |
| 2,614,648 | A | 10/1952 | Wilson |
| 2,709,642 | A | 5/1955 | Mann, Jr. et al. |
| 2,727,882 | A | 12/1955 | Vodonik |
| 2,753,249 | A | 7/1956 | Idenden et al. |
| 2,820,815 | A | 1/1958 | Matuszak et al. |
| 2,829,153 | A | 4/1958 | Vodonik |
| 2,905,707 | A | 9/1959 | Hurt et al. |
| 2,973,341 | A | 2/1961 | Hippe et al. |
| 3,044,993 | A | 7/1962 | Tiemersma |
| 3,052,711 | A | 9/1962 | Glogau et al. |
| 3,054,776 | A | 9/1962 | Higgins |
| 3,110,547 | A | 11/1963 | Emmert |
| 3,113,843 | A | 12/1963 | Li |
| 3,161,710 | A | 12/1964 | Turner |
| 3,174,830 | A | 3/1965 | Watzl et al. |
| 3,185,668 | A | 5/1965 | Meyer et al. |
| 3,192,184 | A | 6/1965 | Brill et al. |
| 3,241,926 | A | 3/1966 | Parker et al. |
| 3,250,747 | A | 5/1966 | Mitchell, Jr. et al. |
| 3,251,657 | A | 5/1966 | Bachmann et al. |
| 3,254,965 | A | 6/1966 | Ogle |
| 3,376,353 | A | 4/1968 | Tate |
| 3,385,881 | A | 5/1968 | Bachmann et al. |
| 3,390,965 | A | 7/1968 | Ditmar |
| 3,402,023 | A | 9/1968 | Dobo |
| 3,427,287 | A | 2/1969 | Pengilly |
| 3,438,942 | A | 4/1969 | Scheller |
| 3,442,868 | A | 5/1969 | Ogata et al. |
| 3,458,467 | A | 7/1969 | Herrie et al. |
| 3,468,849 | A | 9/1969 | Rothert |
| 3,480,587 | A | 11/1969 | Porter |
| 3,487,049 | A | 12/1969 | Busot |
| 3,496,146 | A | 2/1970 | Mellichamp, Jr. |
| 3,496,159 | A | 2/1970 | Spence |
| 3,496,220 | A | 2/1970 | McCarty et al. |
| 3,497,473 | A | 2/1970 | Kemkes |
| 3,507,905 | A | 4/1970 | Girantet et al. |
| 3,509,203 | A | 4/1970 | Michaelis et al. |
| 3,511,615 | A | 5/1970 | Roget et al. |
| 3,522,214 | A | 7/1970 | Crawford et al. |
| 3,534,082 | A | 10/1970 | Armstrong et al. |
| 3,551,396 | A | 12/1970 | Lanthier |
| 3,582,244 | A | 6/1971 | Siclari et al. |
| 3,590,070 | A | 6/1971 | Martin et al. |
| 3,590,072 | A | 6/1971 | Leybourne |
| 3,595,846 | A | 7/1971 | Rouzier |
| 3,600,137 | A | 8/1971 | Girantet et al. |
| 3,609,125 | A | 9/1971 | Fujimoto et al. |
| 3,639,448 | A | 2/1972 | Matsuzawa et al. |
| 3,644,096 | A | 2/1972 | Lewis et al. |
| 3,644,294 | A | 2/1972 | Siclari et al. |
| 3,644,483 | A | 2/1972 | Griehl et al. |
| 3,646,102 | A | 2/1972 | Kobayashi et al. |
| 3,647,758 | A | 3/1972 | Ryffel et al. |
| 3,651,125 | A | 3/1972 | Lewis et al. |

(Continued)

FOREIGN PATENT DOCUMENTS

BE 780142 3/1972

(Continued)

OTHER PUBLICATIONS

USPTO Notice of Allowance dated Jan. 2, 2009 for copending U.S. Appl. No. 11/891,149.

(Continued)

*Primary Examiner*—Terressa M Boykin
(74) *Attorney, Agent, or Firm*—Jennifer R. Knight; Bernard J. Graves, Jr.

(57) ABSTRACT

A sloped tubular reactor operable to facilitate a chemical reaction in a reaction medium flowing therethrough. The reactor can include a plurality of spaced apart internal trays disposed at different elevations in a downwardly sloping elongated tubular member.

62 Claims, 1 Drawing Sheet

U.S. PATENT DOCUMENTS

| | | |
|---|---|---|
| 3,676,485 A | 7/1972 | Lewis et al. |
| 3,684,459 A | 8/1972 | Tate et al. |
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,002,116 A | 3/1991 | Hoagland et al. |
| 5,037,955 A | 8/1991 | Dighton |
| 5,041,525 A | 8/1991 | Jackson |
| 5,064,935 A | 11/1991 | Jackson et al. |
| 5,110,325 A | 5/1992 | Lerner |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Shaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,599,900 A | 2/1997 | Bhatia |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,174,970 B1 | 1/2001 | Braune |

| | | | | | | |
|---|---|---|---|---|---|---|
| 6,252,034 | B1 | 6/2001 | Uenishi et al. | GB | 1 277 376 | 6/1972 |
| 6,339,031 | B1 | 1/2002 | Tan | GB | 1320769 | 6/1973 |
| 6,355,738 | B2 | 3/2002 | Nakamachi | GB | 2010294 | 6/1979 |
| 6,359,106 | B1 | 3/2002 | Nakamoto et al. | GB | 2020194 | 11/1979 |
| 6,399,031 | B1 | 6/2002 | Herrmann et al. | GB | 2 052 535 | 1/1981 |
| 6,458,916 | B1 | 10/2002 | Yamaguchi et al. | GB | 2052535 | 1/1981 |
| 6,545,176 | B1 | 4/2003 | Tsay et al. | JP | 42 4993 B | 3/1967 |
| 6,551,517 | B1 | 4/2003 | Sentagnes et al. | JP | 42 18353 B | 9/1967 |
| 6,576,774 | B2 | 6/2003 | Scardino et al. | JP | 47 39043 A | 4/1971 |
| 6,590,062 | B2 | 7/2003 | Yamaguchi et al. | JP | 48 94795 A | 12/1973 |
| 6,623,643 | B2 | 9/2003 | Chisholm et al. | JP | 49 28698 A | 3/1974 |
| 6,631,892 | B1 | 10/2003 | Erickson | JP | 49 34593 A | 3/1974 |
| 6,642,407 | B2 | 11/2003 | Rao et al. | JP | 49 105893 A | 10/1974 |
| 6,703,454 | B2 | 3/2004 | Debruin | JP | 50 82197 A | 7/1975 |
| 6,723,826 | B2 | 4/2004 | Yamaguchi et al. | JP | 51 29460 A | 3/1976 |
| 6,814,944 | B1 | 11/2004 | Matsui et al. | JP | 51 100036 A | 9/1976 |
| 6,815,525 | B2 | 11/2004 | Debruin | JP | 51 136788 A | 11/1976 |
| 6,861,494 | B2 | 3/2005 | Debruin | JP | 51 136789 A | 11/1976 |
| 6,906,164 | B2 | 6/2005 | Debruin | JP | 52 51495 A | 4/1977 |
| 6,916,939 | B2 | 7/2005 | Yamane et al. | JP | 52 71432 A | 6/1977 |
| 7,008,546 | B2 | 3/2006 | Edmondson | JP | 52 78845 A | 7/1977 |
| 7,049,462 | B2 | 5/2006 | Nagare et al. | JP | 52 83424 A | 7/1977 |
| 7,074,879 | B2 | 7/2006 | Debruin et al. | JP | 52 87133 A | 7/1977 |
| 7,658,817 | B2 | 2/2010 | Fukuoka et al. | JP | 53 31793 A | 3/1978 |
| 2002/0128399 | A1 | 9/2002 | Nakamoto et al. | JP | 53 34894 A | 3/1978 |
| 2002/0161166 | A1 | 10/2002 | Nakane et al. | JP | 54 41833 A | 4/1979 |
| 2002/0180099 | A1 | 12/2002 | Keillor, III | JP | 54 76535 A | 6/1979 |
| 2003/0037910 | A1 | 2/2003 | Smyrnov | JP | 54 79242 A | 6/1979 |
| 2003/0104203 | A1 | 6/2003 | Tam et al. | JP | 54 100494 A | 8/1979 |
| 2003/0133856 | A1 | 7/2003 | Le | JP | 54 157536 A | 12/1979 |
| 2003/0191326 | A1 | 10/2003 | Yamane et al. | JP | 55 43128 A | 3/1980 |
| 2004/0068070 | A1 | 4/2004 | Martan et al. | JP | 55 108422 A | 8/1980 |
| 2004/0197618 | A1 | 10/2004 | Harada et al. | JP | 55 135133 A | 10/1980 |
| 2004/0249111 | A1 | 12/2004 | Debruin | JP | 58 129020 A | 8/1983 |
| 2005/0059782 | A1 | 3/2005 | Andrist et al. | JP | 59 47226 A | 3/1984 |
| 2005/0222371 | A1 | 10/2005 | Wilhelm et al. | JP | 59 53530 A | 3/1984 |
| 2006/0008661 | A1 | 1/2006 | Wijesundara et al. | JP | 59 68326 A | 4/1984 |
| 2006/0251546 | A1 | 11/2006 | Yount et al. | JP | 59 71326 A | 4/1984 |
| 2006/0251547 | A1 | 11/2006 | Windes et al. | JP | 60 15421 A | 1/1985 |
| 2007/0037959 | A1 | 2/2007 | DeBruin | JP | 60 72845 A | 4/1985 |
| 2008/0139760 | A1 | 6/2008 | DeBruin | JP | 60 115551 A | 6/1985 |
| 2009/0016940 | A1* | 1/2009 | DeBruin et al. ............. 422/131 | JP | 60 120839 A | 6/1985 |
| | | | | JP | 60 163918 A | 8/1985 |
| FOREIGN PATENT DOCUMENTS | | | | JP | 60 226846 A | 11/1985 |
| BR | | 7906279 | 7/1981 | JP | 62 207325 A | 9/1987 |
| DE | | 2200832 | 1/1972 | JP | 62 292831 A | 12/1987 |
| DE | | 125 798 | 5/1977 | JP | 64 56726 A | 3/1989 |
| DE | | 126 073 | 6/1977 | JP | 1 102044 A | 4/1989 |
| DE | | 146 298 | 2/1981 | JP | 3 192118 A | 8/1991 |
| DE | | 206 558 | 2/1984 | JP | 3 292323 A | 12/1991 |
| DE | | 229 415 | 11/1985 | JP | 5-78402 | 3/1993 |
| DE | | 4235785 A1 | 5/1994 | JP | 5 155994 A | 6/1993 |
| DE | | 195 25 579 | 12/1996 | JP | 6 247899 A | 9/1994 |
| DE | | 195 37 930 | 4/1997 | JP | 7 118208 A | 5/1995 |
| DE | | 103 36 164 A1 | 3/2005 | JP | 7 173268 A | 7/1995 |
| DE | | 10 2004 038 466 | 10/2005 | JP | 7 238151 A | 9/1995 |
| DE | | 10 2004 034 708 A1 | 2/2006 | JP | 7 313 865 | 12/1995 |
| EP | | 0 070 707 A1 | 1/1983 | JP | 8 198960 A | 8/1996 |
| EP | | 0 105 111 | 7/1983 | JP | 8 283398 A | 10/1996 |
| EP | | 0 105 111 A1 | 7/1983 | JP | 10 36495 A | 2/1998 |
| EP | | 0 850 962 A2 | 7/1998 | JP | 10 259244 A | 9/1998 |
| EP | | 0 999 228 A2 | 5/2000 | JP | 11 092555 A | 4/1999 |
| EP | | 1 065 193 A1 | 1/2001 | JP | 11 106489 A | 4/1999 |
| FR | | 2168990 | 9/1973 | JP | 11 217429 A | 8/1999 |
| FR | | 2302778 A1 | 3/1975 | JP | 2000/095851 A | 4/2000 |
| GB | | 777 128 | 6/1957 | JP | 2004 238329 | 8/2004 |
| GB | | 777 628 | 6/1957 | KR | 1993-0005144 B1 | 6/1993 |
| GB | | 1001787 | 8/1965 | KR | 1994-0011540 B1 | 3/1994 |
| GB | | 1013034 | 12/1965 | NL | 6704303 | 9/1967 |
| GB | | 1055918 | 1/1967 | PL | 136188 | 8/1987 |
| GB | | 1122538 | 8/1968 | SU | 973552 | 11/1982 |
| GB | | 1154538 | 6/1969 | WO | 95/29752 | 11/1995 |
| | | | | WO | WO 96/22318 | 7/1996 |

| WO | WO 98/08602 | 3/1998 |
| WO | WO 98/10007 | 3/1998 |
| WO | WO 99/16537 | 4/1999 |
| WO | 99/39815 | 8/1999 |
| WO | WO 02/26841 A1 | 4/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |
| WO | 2007065211 | 6/2007 |

OTHER PUBLICATIONS

USPTO Notice of Allowance dated Jan. 28, 2009 for copending U.S. Appl. No. 11/506,346.
USPTO Office Action dated Jan. 30, 2009 for copending U.S. Appl. No. 11/715,546.
USPTO Office Action dated Feb. 4, 2009 for copending U.S. Appl. No. 11/635,411.
USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
USPTO Office Action dated Jul. 18, 2008 for copending U.S. Appl. No. 11/506,346.
Ekivana, N.I. et al., "Structure Formation in Terephthalic Acid Pastes," 1968, Chemical Abstracts Service, Columbus OH.
Copending U.S. Appl. No. 11/506,105, filed Aug. 17, 2006, Bruce Roger DeBruin.
Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,597, filed Jul. 12, 2007, Bruce Roger DeBruin.
Copending U.S. Appl. No. 11/776,599, filed Jul. 12, 2007, Bruce Roger DeBruin et al.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/776,591, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, 6$^{th}$ Edition, McGraw-Hill, United States.

Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.

Perry, Robert H. and Green, Don, "Fluid and Particle Mechanics," Perry's Chemical Engineer's Handbook, 1984, 14-82 to 14-95, $6^{th}$ Edition, McGraw-Hill, United States.

Nauman, E.B., "Enhancement of Heat Transfer and Thermal Homogenity with Motionless Mixers," American Institute of Chemical Engineer's Journal, 1979, pp. 246-258, vol. 25, No. 2.

Brodkey, Robert S., "Multiphase Phenomena I: Pipe Flow," The Phenomena of Fluid Motions, 1967, pp. 456-538, Addison-Wesley Publishing Company, United States.

Gupta, S.K. and Kumar, Anil, "Polyester Reactors," Plenum Chemical Engineering Series, 1987, Chapter 8, pp. 241-318, Plenum Press, New York.

Stahl, Wegmann, Von Rohr; Tubular Reactor for Liquid Reactions with Gas Release, 2003, Catalysis Today, 79-80, pp. 89-95.

USPTO Notice of Allowance dated Nov. 17, 2009 for copending U.S. Appl. No. 12/173,354.

USPTO Office Action dated Feb. 18, 2010 for copending U.S. Appl. No. 11/776,597.

USPTO Office Action dated Feb. 18, 2010 for copending U.S. Appl. No. 11/776,599.

USPTO Office Action dated Feb. 18, 2010 for copending U.S. Appl. No. 11/776,600.

USPTO Office Action dated Feb. 18, 2010 for copending U.S. Appl. No. 11/776,603.

USPTO Office Action dated Feb. 18, 2010 for copending U.S. Appl. No. 11/776,591.

USPTO Office Action dated Feb. 24, 2010 for copending U.S. Appl. No. 11/776,598.

USPTO Office Action dated Feb. 24, 2010 for copending U.S. Appl. No. 11/776,595.

USPTO Office Action dated Jan. 11, 2010 for copending U.S. Appl. No. 11/635,360.

USPTO Office Action dated Jan. 20, 2010 for copending U.S. Appl. No. 12/186,739.

International Search Report and Written Opinion for PCT/US2008/008346, dated Oct. 23, 2008.

Perry's Chemical Engineers' Handbook, 7th Edition, pp. 8-49 to 8-50 and pp. 14-82 to 14-95, 1997, The McGraw-Hill Companies, Inc., United States.

USPTO Notice of Allowance dated Jun. 23, 2010 in copending U.S. Appl. No. 11/776,595.

USPTO Notice of Allowance dated Jun. 23, 2010 in copending U.S. Appl. No. 11/776,598.

USPTO Notice of Allowance dated Jun. 23, 2010 in copending U.S. Appl. No. 11/776,597.

USPTO Notice of Allowance dated Jun. 24, 2010 in copending U.S. Appl. No. 11/776,603.

USPTO Notice of Allowance dated Jun. 25, 2010 in copending U.S. Appl. No. 11/776,591.

USPTO Notice of Allowance dated Jun. 28, 2010 in copending U.S. Appl. No. 11/776,600.

USPTO Notice of Allowance dated Jun. 28, 2010 in copending U.S. Appl. No. 11/776,599.

USPTO Notice of Allowance dated Jul. 14, 2010 in copending U.S. Appl. No. 11/715,564.

USPTO Notice of Allowance dated Jul. 23, 2010 in copending U.S. Appl. No. 12/186,739.

USPTO Supplementary Notice of Allowance dated Sep. 21, 2010 in copending U.S. Appl. No. 11/715,564.

* cited by examiner

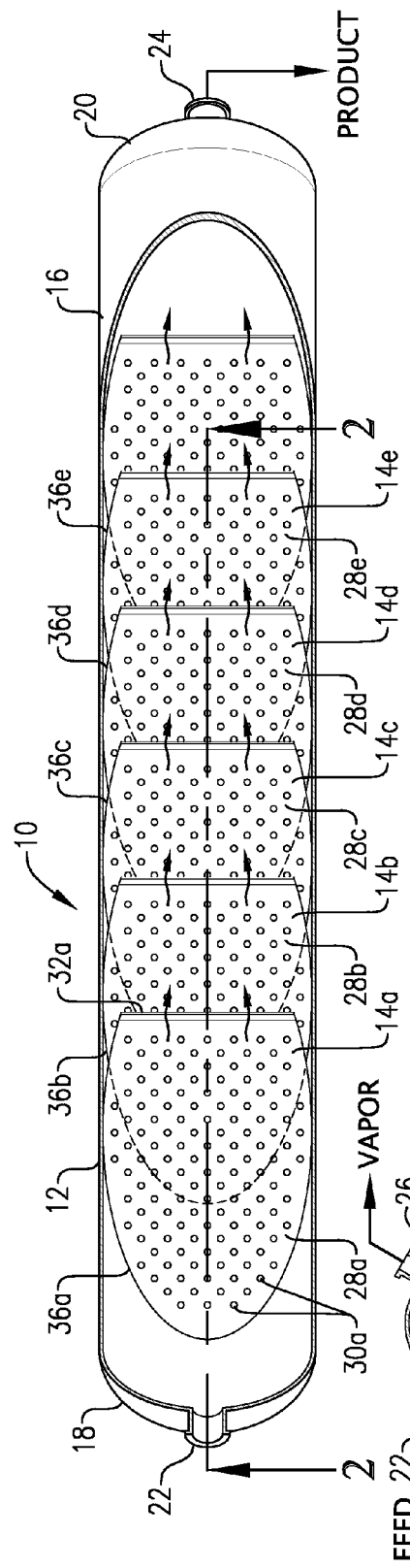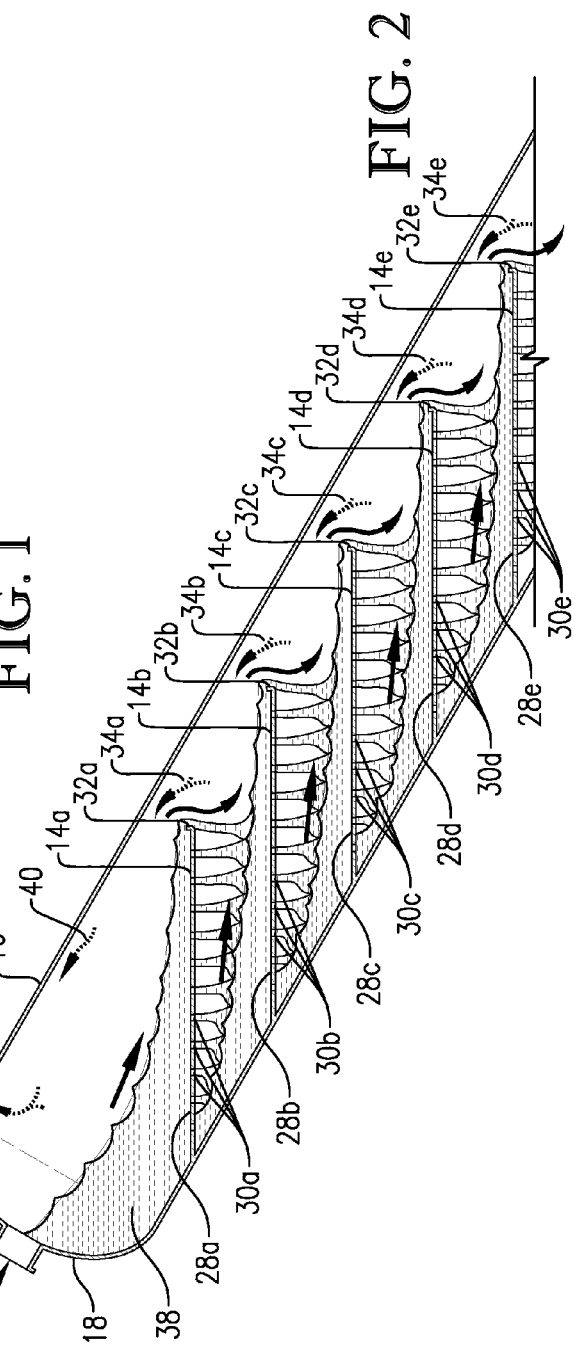

SLOPED TUBULAR REACTOR WITH SPACED SEQUENTIAL TRAYS

BACKGROUND OF THE INVENTION

1. Field of the Invention

This invention relates to reactors for processing liquid-containing reaction mediums. In another aspect, the invention concerns polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Thus, a need exists for a high efficiency polyester process that minimizes capital, operating, and maintenance costs while maintaining or enhancing product quality.

SUMMARY OF THE INVENTION

In one embodiment of the present invention, there is provided a process comprising subjecting a reaction medium to a chemical reaction in a reactor comprising a downwardly sloped elongated tubular member and a plurality of spaced apart trays disposed in the tubular member. The tubular member is elongated along a central axis of elongation that is oriented at a downward angle in the range of from about 5 to about 75 degrees below horizontal. Each of the trays presents an upwardly facing surface across which at least a portion of the reaction medium flows as the reaction medium flows through the reactor.

In another embodiment of the present invention, there is provided a process for making polyethylene terephthalate (PET), the process comprising: (a) introducing a polycondensation feed into a polycondensation reactor, wherein the polycondensation feed forms a predominately liquid reaction medium in the reactor, wherein the polycondensation feed comprises PET having an average chain length in the range of from about 5 to about 100; (b) subjecting the reaction medium to polycondensation in the reactor, wherein the reactor comprises a substantially straight downwardly sloped pipe and at least four spaced apart trays disposed at different elevations in the pipe, wherein the pipe is sloped downwardly at an angle in the range of from about 10 to about 60 degrees below horizontal, wherein the reaction medium flows primarily by gravity through the reactor, wherein each of the trays presents an upwardly facing surface across which at least a portion of the reaction medium flows as the reaction medium flows through the reactor, wherein the upwardly facing surface is sloped less than about 10 degrees from horizontal, wherein each of the trays defines a plurality of apertures through which at least a portion of the reaction medium passes as the reaction medium flows through the reactor; and (c) recovering a predominately liquid polycondensation product from the reactor, wherein the polycondensation product comprises PET having an average chain length that is at least about 10 greater than the average chain length of the PET in the polycondensation feed.

In still another embodiment of the present invention, there is provided a reactor comprising a downwardly sloped tubular member and a plurality of spaced apart trays disposed at different elevations in the tubular member. The tubular member is elongated along a central axis of elongation that is oriented at a downward angle in the range of from about 5 to about 75 degrees below horizontal. Each of the trays presents an upwardly facing surface that is sloped less than about 25 degrees from horizontal.

BRIEF DESCRIPTION OF THE DRAWINGS

Certain embodiments of the present invention are described in detail below with reference to the enclosed figures, wherein:

FIG. 1 is a cut-away top view a sloped tubular reactor configured in accordance with one embodiment of the present invention and suitable for use as a polycondensation reactor in a melt-phase polyester production facility; and FIG. 2 is a partial sectional side view of the sloped tubular reactor taken along line 2-2 in FIG. 1, particularly illustrating the manner in which a reaction medium passes over and through the series of spaced apart internal trays as it progresses downwardly through the reactor.

DETAILED DESCRIPTION

FIGS. 1 and 2 illustrate an exemplary sloped tubular reactor configured in accordance with one embodiment of the present invention. The configuration and operation of the reactor depicted in FIGS. 1 and 2 are described in detail below. Although certain portions of the following description relate primarily to reactors employed in a melt-phase polyester production process, reactors configured in accordance with embodiments of the present invention may find application in a wide variety of chemical processes. For example, reactors configured in accordance with certain embodiments of the present invention may be advantageously employed in any process where chemical reactions take place in the liquid phase of a reaction medium and a vapor is produced as a result of the chemical reaction. Further, reactors configured in accordance with certain embodiments of the present invention may be advantageously employed in chemical processes that are enhanced by increasing the surface area of the reaction medium.

Referring now to FIGS. 1 and 2, one embodiment of a sloped tubular reactor 10 is illustrated as generally comprising a vessel shell 12 and a series of spaced apart internal trays 14a-e disposed in shell 12. Vessel shell 12 comprises a downwardly sloping tubular member 16, an upper end cap 18 coupled to the top of tubular member 16, and a lower end cap 20 coupled to the bottom of tubular member 16. Vessel shell 12 defines a feed inlet 22 near the top of reactor 10, a liquid product outlet 24 near the bottom of reactor 10, and a vapor outlet 26 near the top of reactor 10.

Tubular member 16 is elongated along a downwardly sloping central axis of elongation. In certain embodiments of the present invention, the central axis of elongation of tubular member 16 is sloped at an angle in the range of from about 5 to about 75 degrees below horizontal, about 10 to about 60 degrees below horizontal, or 12 to 45 degrees below horizontal. In the embodiment illustrated in FIGS. 1 and 2, tubular member 16 is a substantially straight, substantially cylindrical, elongated pipe. However, in certain embodiments, tubular member 16 can be an elongated tubular member having a variety of cross-sectional configurations (e.g., rectangular, square, or oval).

Vessel shell 12 and/or tubular member 16 can have a maximum internal length (L) that is greater than its maximum internal diameter (D). In certain embodiments, shell 12 and/or tubular member 16 has a length-to-diameter (L:D) ratio in the range of from about 2:1 to about 50:1, about 4:1 to about 30:1, or 8:1 to 20:1. In certain embodiments, L is in the range of from about 10 to about 200 feet, about 20 to about 150 feet, or 30 to 80 feet, and D is in the range of from about 1 to about 20 feet, about 2 to about 10 feet, or 3 to 5 feet.

Internal trays 14*a-e* present respective upwardly facing surfaces 28*a-e* across which a liquid can flow, as described in detail below. In the embodiment illustrated in FIGS. 1 and 2, upwardly facing surfaces 28*a-e* of trays 14*a-e* are substantially planar and substantially horizontal. Alternatively, upwardly facing surfaces can extend at any angle that is within about 25 degrees of horizontal, within about 10 degrees of horizontal, or within 3 degrees of horizontal.

Trays 14*a-e* each define a plurality of downwardly extending apertures 30*a-e* through which a liquid can flow. Alternatively, at least one or a majority of trays can define a plurality of downwardly extending apertures through which a liquid can flow. The number, size, and shape of apertures 30*a-e* can vary greatly depending, for example, on the production capacity of reactor 10 and the viscosity of the medium processed therein. In certain embodiments of the present invention, each tray 14*a-e* defines in the range of from about 5 to about 200,000 apertures, about 200 to about 50000 apertures, or 1000 to 10000 apertures. In certain embodiments of the present invention, the average number of holes per unit area is in the range from about 0.5 to about 50 holes per square inch, about 1 to about 20 holes per square inch, or 3 to 10 holes per square inch. In certain embodiments of the present invention, the percent open of each tray 14*a-e* is in the range of from about 5 to about 80 percent, about 10 to about 60 percent, or 15 to 50 percent.

Trays 14*a-e* each present respective terminal edges 32*a-e* that are spaced from the inside wall of tubular member 16. Alternatively, at least one or a majority of trays can present terminal edges that are spaced from the inside wall of tubular member 16. Flow passageways 34*a-e* are defined by the gaps between the inside wall of tubular member 16 and terminal edges 32*a-e* of trays 14*a-e*, respectively. One or more of trays 14*a-e* can, optionally, be equipped with an upwardly extending weir located proximate terminal edges 32*a-e*. Trays 14*a-e* also present respective coupling edges 36*a-e* that are sealingly coupled to the inside wall of tubular member 16 by any suitable method (e.g., welding).

In the embodiment illustrated in FIGS. 1 and 2, each tray 14*a-e* is a substantially flat, substantially horizontal plate that is sealingly coupled to the inside wall of downwardly sloped tubular member 16 at its respective coupling edge 36*a-e*. Thus, in the embodiment depicted in FIGS. 1 and 2, the shape of each tray 14*a-e* can generally be that of a truncated oval, with coupling edges 36*a-e* defining the curved portion of the oval and terminal edges 32*a-e* defining the truncated portion of the oval.

Although FIGS. 1 and 2, show trays 14*a-e* as being supported in tubular member 16 via the rigid attachment of coupling edges 36*a-e* to the inside wall of tubular member 16, it should be noted that a variety of mechanisms for supporting trays 14*a-e* in tubular member 16 can be employed. For example, trays 14*a-e* can be supported in tubular members 16 using support members that support trays 14*a-e* from the bottom of tubular member 16 and/or suspend trays 14*a-e* from the top of tubular member 16. However, if the sides of trays 14*a-e* are spaced from the inside wall of tubular member, tray sidewalls may be required to keep reaction medium from prematurely flowing around the sides of trays 14*a-e*.

In the embodiment illustrated in FIGS. 1 and 2, each tray 14*a-e* has a substantially identical configuration. However, in certain embodiments of the present invention, the orientation and/or configuration of trays 14*a-e* can be different in order to optimize the configuration of reactor 10 to match the application for with reactor 10 is employed. For example, when reactor 10 is used to process a reaction medium whose viscosity increases as it flows downwardly through reactor 10, it may be desirable for trays 14*a-e* to have an increasing downward slope to facilitate the flow of the higher viscosity reaction medium across the lower trays. Further, in such an application, it may be desired for the size of apertures 30*a-e*, number of apertures 30*a-e*, or percent open of trays 14*a-e* to increase downwardly to facilitate flow of the higher viscosity reaction medium through the lower trays.

The total number of internal trays 14 employed in reactor 10 can vary greatly depending on a variety of factors such as, for example, the length of tubular member 16, the slope of tubular member 16, and the viscosity of the medium processed in reactor 10. In certain embodiments of the present invention, the number of trays 14 employed in reactor 10 can be at least 4, at least 6, or in the range of from about 2 to about 50, about 4 to about 25, or 6 to 15.

In operation, a predominately liquid feed is introduced into reactor 10 via feed inlet 22. In the upper portion of reactor 10, the feed forms a predominately liquid reaction medium 38 that flows downwardly on the bottom of tubular member 16 until it reaches uppermost internal tray 14*a*.

Once reaction medium 38 is on uppermost tray 14*a*, it flows across the upwardly facing surface 28*a*. When tray 14*a* is configured with apertures 30*a*, a portion of reaction medium 38 passes downwardly through apertures 30*a* and onto the bottom of tubular member 16 and/or onto the upwardly facing surface 28*b* of the next lower tray 14*b*. In accordance with one embodiment of the present invention, the portion of reaction medium 38 that passes through apertures 30*a* forms strands that extend below tray 14*a*. These strands can greatly increase the surface area of reaction medium 38 when compared to the flow of reaction medium 38 through a non-trayed tubular member or across a tray without apertures. In one embodiment, reaction medium 38 flows primarily by gravity through reactor 10.

The portion of reaction medium 38 that does not pass through apertures 30*a* flows over terminal edge 32*a* of tray 14*a*, passes downwardly through flow passageway 34*a*, and onto the next lower tray 14*b*. When tray 14*a* is equipped with a weir, the portion of the reaction medium flowing over terminal edge 32*a* must pass over, around, through openings in, and/or under the weir prior to entering flow passageway 34*a*. Flow of reaction medium 38 over and through the remaining trays 14*b-e* can occur in generally the same manner as described above for uppermost tray 14*a*.

As reaction medium 38 flows through reactor 10, a chemical reaction takes place within reaction medium 38. A vapor 40 can be formed in reactor 10. Vapor 40 can comprise one or more byproducts of the chemical reaction carried out in reactor 10 and/or one or more volatile compounds present in the feed to reactor 10 that vaporize therein. Vapor 40 is disengaged from and flows generally upwardly and over reaction medium 38 as reaction medium 38 progresses downwardly through reactor 10. In particular, vapor 40 generated in the lower portion of reactor 10 can pass upwardly through flow passageways 34a-e countercurrent to reaction medium 38 passing downwardly through flow passageways 34a-e. Vapor 40 exits reactor 10 via vapor outlet 26, while reaction medium 38 exits reactor 10 as a predominately liquid product via liquid product outlet 24. Alternatively, vapor 40 can flow generally downwardly with reaction medium 38 and exit a vapor outlet (not shown) located near the lower end of reactor 10.

As mentioned above, weirs can be employed on one or more trays 14a-e to help maintain the desired depth of reaction medium 38 on trays 14a-e. In one embodiment of the present invention, the maximum depth of reaction medium 38 on each tray 14a-e is less than about 0.8D, less than about 0.4D, or less than 0.25D, where D is the maximum internal diameter of tubular member 16.

Sloped tubular reactors configured in accordance with certain embodiments of the present invention require little or no mechanical agitation of the reaction medium processed therein. Although the reaction medium processed in the sloped tubular reactor may be somewhat agitated by virtue of flowing through the reactor and falling from one reactor level to another, this flow agitation and gravitational agitation is not mechanical agitation. In one embodiment of the present invention, less than about 50 percent, less than about 25 percent, less than about 10 percent, less than about 5 percent, or 0 percent of the total agitation of the reaction medium processed in the sloped tubular reactor is provided by mechanical agitation. Thus, reactors configured in accordance with certain embodiments of the present invention can operate without any mechanical mixing devices. This is in direct contrast to conventional continuous stirred tank reactors (CSTRs) which employ mechanical agitation almost exclusively.

As indicated above, sloped tubular reactors configured in accordance with embodiments of the present invention reactors can be used in a variety of chemical processes. In one embodiment, a sloped tubular reactor configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexane-dimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, diphenyl-3,4'-dicarboxylic acid, 2,2-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglycol, trans-DMCD, trimellitic anhydride, dimethyl cyclohexane-1,4dicarboxylate, dimethyl decalin-2,6dicarboxylate, decalin dimethanol, decahydronaphthalene 2,6-dicarboxylate, 2,6-dihydroxymethyl-decahydronaphthalene, hydroquinone, hydroxybenzoic acid, and mixtures thereof.

According to one embodiment of the present invention, the esterification in the esterification stage can be carried out at a reaction medium temperature in the range of from about 180 to about 350° C., or about 215 to about 305° C., or 260 to 290° C. and a vapor space pressure of less than about 70 psig, in the range of from about −4 to about 10 psig, or 2 to 5 psig. The average chain length of the monomer and/or oligomer exiting the esterification stage can be in the range of from about 1 to about 20, about 2 to about 15, or 5 to 12.

Reactors configured in accordance with certain embodiments of the present invention can be employed in a melt-phase polyester production system as a prepolymer reactor for carrying out a prepolymerization step and/or as a finisher reactor for carrying out a finishing step. A detailed description of the process conditions for the present invention employed as a prepolymer reactor and/or a finisher reactor is given below with reference to FIG. 1. It is understood that reactors configured in accordance with embodiments of the present invention can generally be employed as prepolymer reactors and/or finisher reactors and that these process conditions are not limited to the embodiment described in FIG. 1.

Referring again to FIG. 1, when reactor 10 is employed as a prepolymer reactor in a melt-phase polyester production process (e.g., a process for making PET), more than one chemical reaction can be carried out in reactor 10. For example, although polycondensation may be the predominate chemical reaction carried out in reactor 10, a certain amount of esterification may also occur in reactor 10. When reactor 10 is employed as a prepolymer reactor, the average chain length of the feed introduced into feed inlet 22 can be in the range of from about 1 to about 20, about 2 to about 15, or 5 to 12, while the average chain length of the predominately liquid product withdrawn from liquid product outlet 24 can be in the range of from about 5 to about 50, about 8 to about 40, or 10 to 30. When reactor 10 is employed as a prepolymerization reactor, the chemical reaction carried out in reactor 10 can cause the average chain length of reaction medium 38 to increase by at least about 2, in the range of from about 5 to about 30, or in the range of from 8 to 20 between feed inlet 22 and liquid product outlet 24.

When reactor 10 is employed as a prepolymer reactor, the feed can enter feed inlet 22 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 22. In one embodiment, the temperature of the liquid product exiting liquid product outlet 24 is in the range of from about 220 to about 350° C., about 265 to about 305° C., or 270 to 290° C. In one embodiment, the average temperature of reaction medium 38 in reactor 10 is in the range of from about 220 to about 350° C., about 265 to about 305° C., or 270 to 290° C. The average temperature of reaction medium 38 is the average of at least three temperature measurements taken at equal spacings along the primary flow path of reaction medium 38 through reactor 10, where the temperature measurements are each taken near the cross sectional centroid of reaction medium 38 (as opposed to near the wall of the reactor or near the upper liquid surface of the reaction medium). When reactor 10 is employed as a prepolymer reactor, the vapor space pressure in reactor 10 (measured at vapor outlet 26) can be maintained in the range of from about 0 to about 300 torr, in the range of from about 1 to about 50 torr, or in the range of from 20 to 30 torr.

When reactor 10 is employed as a prepolymer reactor, it may be desirable to heat the feed prior to introduction into reactor 10 and/or it may be desirable to heat reaction medium 38 as it flows through reactor 10. Generally, the cumulative amount of heat added to the feed immediately upstream of reactor 10 plus any heat added to reaction medium 38 in reactor 10 can be in the range of from about 100 to about 5,000 BTU/lb, in the range of from about 400 to about 2,000 BTU/lb, in the range of from 600 to 1,500 BTU/lb.

Referring again to FIG. 1, when reactor 10 is employed as a finisher reactor in a melt-phase polyester production process (e.g., a process for making PET), the average chain length of the feed introduced into feed inlet 22 can be in the range of from about 5 to about 50, about 8 to about 40, or 10 to 30, while the average chain length of the predominately liquid product withdrawn from liquid product outlet 24 can be in the range of from about 30 to about 210, about 40 to about 80, or 50 to 70. Generally, the polycondensation carried out in reactor 10 can cause the average chain length of reaction medium 38 to increase by at least about 10, at least about 25, or at least 50 between feed inlet 22 and liquid product outlet 24.

When reactor 10 is employed as a finisher reactor, the feed can enter feed inlet 22 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 22. In one embodiment, the temperature of the liquid product exiting liquid product outlet 24 is in the range of from about 220 to about 350° C., about 265 to about 305° C., or 270 to 290° C. In one embodiment, the average temperature of reaction medium 38 in reactor 10 is in the range of from about 220 to about 350° C., about 265 to about 305° C., or 270 to 290° C. When reactor 10 is employed as a finisher reactor, the vapor space pressure in reactor 10 (measured at vapor outlet 26) can be maintained in the range of from about 0 to about 30 torr, in the range of from about 1 to about 20 torr, or in the range of from 2 to 10 torr.

Reactors configured in accordance with embodiments of the present invention can provide numerous advantages when employed as reactors in the polycondensation stages of a polyester production process. Such reactors can be particularly advantageous when employed as prepolymer and/or finisher reactors in a process for making PET. Further, such reactors are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising subjecting a reaction medium to a chemical reaction in a reactor comprising a downwardly sloped elongated tubular member and a plurality of spaced apart trays disposed in the tubular member. The tubular member is elongated along a central axis of elongation that is oriented at a downward angle in the range of from about 5 to about 75 degrees below horizontal. Each of the trays presents an upwardly facing surface across which at least a portion of the reaction medium flows as the reaction medium flows through the reactor. The detailed description of FIGS. 1 and 2, such as the tubular member, trays, and reaction medium flow, apply to this embodiment.

In one example, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln \eta_r)/C$$

where $\eta_{int}$=Intrinsic viscosity
$\eta_r$=Relative viscosity=$t_s/t_o$
$\eta_{sp}$=Specific viscosity=$\eta_r - 1$ The intrinsic viscosity (It.V. or $\eta_{int}$) may be estimated using the Billmeyer equation as follows:

$$\eta_{int} = 0.5[e^{0.5 \times Ih.V.} - 1] + (0.75 \times Ih.V.)$$

The reference for estimating intrinsic viscosity (Billmeyer relationship) is J. *Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a process for making polyethylene terephthalate (PET), the process comprising: (a) introducing a polycondensation feed into a polycondensation reactor, wherein the polycondensation feed forms a predominately liquid reaction medium in the reactor, wherein the polycondensation feed comprises PET having an average chain length in the range of from about 5 to about 100, about 5 to about 50, about 8 to about 40, or 10 to 30; (b) subjecting the reaction medium to polycondensation in the reactor, wherein the reactor comprises a substantially straight downwardly sloped pipe and at least 4, at least 6, or in the range of from about 2 to about 50, about 4 to about 25, or 6 to 15 spaced apart trays disposed at different elevations in the pipe, wherein the pipe is sloped downwardly at an angle in the range of from about 5 to about 75 degrees below horizontal, about 10 to about 60 degrees below horizontal, or 15 to 45 degrees below horizontal, wherein the reaction medium flows primarily by gravity through the reactor, wherein each of the trays presents an upwardly facing surface across which at least a portion of the reaction medium flows as the reaction medium flows through the reactor, wherein the upwardly facing surface is sloped less than about 10 degrees from horizontal, about 5 degrees from horizontal, or 2 degrees from horizontal, wherein each of the trays defines a plurality of apertures through which at least a portion of the reaction medium passes as the reaction medium flows through the reactor; and (c) recovering a predominately liquid polycondensation product from the reactor, wherein the polycondensation product comprises PET having an average chain length that is at least about 10, at least about 25, or at least 50 greater than the average chain length of the PET in the polycondensation feed. The detailed description of FIGS. 1 and 2, such as the tubular member, trays, and reaction medium flow, apply to this embodiment In one example, the It.V. of the polycondensation feed is in the range of from about 0.1 to about 0.5, about 0.1 to about 0.4, or about 0.15 to about 0.35 dL/g. In one example, the It.V. of or polycondensation product is in the range of from about 0.3 to about 1.2, about 0.35 to about 0.6, or 0.4 to 0.5 dL/g.

In still another embodiment of the present invention, there is provided a reactor comprising a downwardly sloped tubular member and a plurality of spaced apart trays disposed at different elevations in the tubular member. The tubular member is elongated along a central axis of elongation that is oriented at a downward angle in the range of from about 5 to about 75 degrees below horizontal, about 10 to about 60 degrees below horizontal, or 15 to 45 degrees below horizontal. Each of the trays presents an upwardly facing surface that is sloped less than about 10 degrees from horizontal, about 5 degrees from horizontal, or 2 degrees from horizontal. The detailed description of FIGS. 1 and 2, such as the tubular member, trays, and reaction medium flow, apply to this embodiment Numerical Ranges The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromatography (GPC) measurements and/or viscosity measurements.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise," provided below.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "directly coupled" refers to a manner of coupling two vessels in fluid flow communication with one another without the use of an intermediate connector having a substantially narrower diameter than the two vessels.

As used herein, the term "esterification" refers to both esterification and ester exchange reactions.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "percent open" refers to the area of a structure that is open for fluid flow therethrough as a percentage of the total area of the structure measured normal to the direction of flow though the openings in the structure.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vapor byproduct" includes the vapor generated by a desired chemical reaction (i.e., a vapor coproduct) and any vapor generated by other reactions (i.e., side reactions) of the reaction medium.

CLAIMS NOT LIMITED TO DISCLOSED EMBODIMENTS

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: introducing a polycondensation feed into a polycondensation reactor, wherein said polycondensation feed comprises PET and forms a reaction medium in said reactor, subjecting said reaction medium to a polycondensation reaction in said reactor comprising a downwardly sloped elongated tubular member and a plurality of spaced apart trays disposed in said tubular member, wherein said tubular member is elongated along a central axis of elongation that is oriented at a downward angle in the range of from about 5 to about 75 below horizontal, wherein each of said trays presents an upwardly facing surface across which at least a portion of said reaction medium flows as said reaction medium flows through said reactor.

2. The process of claim 1, wherein said upwardly facing surface is sloped less than about 25 degrees from horizontal.

3. The process of claim 2, wherein said downward angle of said tubular member is in the range of from about 10 to about 60 degrees below horizontal.

4. The process of claim 1, wherein said upwardly facing surface is sloped less than about 5 degrees from horizontal, wherein said downward angle of said tubular member is in the range of from about 12 to about 45 degrees below horizontal.

5. The process of claim 1, wherein said upwardly facing surface is substantially planar and substantially horizontal.

6. The process of claim 1, wherein said reaction medium flows by gravity through said reactor.

7. The process of claim 1, wherein said reactor comprises at least four of said trays located at different elevations in said tubular member.

8. The process of claim 7, wherein said tubular member is a pipe.

9. The process of claim 8, wherein each of said trays is substantially flat and substantially horizontal.

10. The process of claim 1, wherein said tubular member has a length-to-diameter (L:D) ratio in the range of from about 2:1 to about 50:1.

11. The process of claim 10, wherein L is in the range of from about 10 to about 200 feet and D is in the range of from about 1 to about 20 feet.

12. The process of claim 1, wherein at least one of said trays defines a plurality of apertures through which a first portion of said reaction medium passes as said reaction medium flows through said reactor.

13. The process of claim 12, wherein said at least one of said trays presents a terminal edge over which a second portion of said reaction medium passes as said reaction medium flows through said reactor.

14. The process of claim 1, wherein each of said trays presents a coupling edge and a terminal edge, wherein said coupling edge is sealingly coupled to the inside wall of said tubular member, wherein said terminal edge is spaced from the inside wall of said tubular member to thereby provide a flow passageway through which said reaction medium can pass.

15. The process of claim 14, wherein said tubular member is a substantially straight downwardly sloping pipe, wherein each of said trays is substantially flat and substantially horizontal, wherein each of said trays has a truncated oval shape with said coupling edge defining the curved portion of the truncated oval and said terminal edge defining the truncated portion of the truncated oval.

16. The process of claim 15, wherein each of said trays defines a plurality of apertures through which at least a portion of said reaction medium flows.

17. The process of claim 16, wherein each of said trays is in the range of from about 5 to about 80 percent open.

18. The process of claim 16, wherein a first portion of said reaction medium flows downwardly through said apertures and a second portion of said reaction medium flows over said terminal edge and downwardly through said flow passageway.

19. The process of claim 16, wherein said reactor comprises in the range of from 2 to 50 of said trays.

20. The process of claim 1, wherein a vapor byproduct of said polycondensation reaction flows upwardly and/or downwardly in said tubular member as said reaction medium flows downwardly in said tubular member.

21. The process of claim 20, further comprising withdrawing at least a portion of said vapor byproduct from said reactor via a vapor outlet located near the top and/or bottom of said reactor.

22. The process of claim 1, wherein said introducing of said polycondensation a feed into said reactor occurs at a feed inlet located near the top of said reactor, further comprising withdrawing a predominately liquid product from said reactor at a product outlet located near the bottom of said reactor.

23. The process of claim 1, wherein the average chain length of said PET in said reaction medium increases by at least about 10 in said reactor.

24. The process of claim 23, wherein said PET in said polycondensation feed has an average chain length in the range of from about 5 to about 50.

25. The process of claim 24, wherein said polycondensation feed is maintained at a temperature in the range of from about 220 to about 350° C., wherein the vapor space pressure in said reactor is maintained in the range of from about 0 to about 30 torr.

26. The process of claim 1, wherein said PET is a PET copolymer comprising at least about 90 mole percent ethylene terephthalate repeat units and up to about 10 mole percent of added comonomer repeat units.

27. The process of claim 26, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

28. The process of claim 27, wherein said added comonomer comprises isophthalic acid.

29. The process of claim 22, wherein said PET in said predominantly liquid product is withdrawn from said reactor at a rate of at least about 10,000 pounds per hour.

30. The process of claim 1, wherein the average chain length of said PET in said reaction medium increases by at least about 2 in said reactor.

31. The process of claim 30, wherein said PET in said polycondensation feed has an average chain length in the range of from about 1 to about 20.

32. The process of claim 31, wherein said polycondensation feed is maintained at a temperature in the range of from about 220 to about 350° C., wherein the vapor space pressure in said reactor is maintained in the range of from about 0 to about 300 torr.

33. The process of claim 1, wherein said reactor comprises no mechanical mixing device.

34. A process for making polyethylene terephthalate (PET), said process comprising:
(a) introducing a polycondensation feed into a polycondensation reactor, wherein said polycondensation feed forms a predominately liquid reaction medium in said reactor, wherein said polycondensation feed comprises PET having an average chain length in the range of from about 5 to about 50;
(b) subjecting said reaction medium to a polycondensation reaction in said reactor, wherein said reactor comprises a substantially straight downwardly sloped pipe and at least four spaced apart trays disposed at different elevations in said pipe, wherein said pipe is sloped downwardly at an angle in the range of from about 10 to about 60 degrees below horizontal, wherein said reaction medium flows primarily by gravity through said reactor, wherein each of said trays presents an upwardly facing surface across which at least a portion of said reaction medium flows as said reaction medium flows through said reactor, wherein said upwardly facing surface is sloped less than about 10 degrees from horizontal, wherein each of said trays defines a plurality of apertures through which at least a portion of said reaction medium passes as said reaction medium flows through said reactor; and
(c) recovering a predominately liquid polycondensation product from said reactor, wherein said polycondensation product comprises PET having an average chain length that is at least about 10 greater than the average chain length of the PET in said polycondensation feed.

35. The process of claim 34, wherein said upwardly facing surface is substantially planar and substantially horizontal.

36. The process of claim 34, wherein each of said trays defines a terminal edge over which at least a portion of said reaction medium passes as said reaction medium flows through said reactor.

37. The process of claim 36, wherein each of said trays is substantially flat and substantially horizontal, wherein each of said trays presents a coupling edge sealingly coupled to the inside wall of said pipe, wherein said terminal edge is spaced from the inside wall of said pipe to thereby provide a flow passageway between said terminal edge and the inside wall of said pipe, wherein at least a portion of said reaction medium flows downwardly through said flow passageway after passing over said terminal edge.

38. The process of claim 37, wherein said polycondensation reaction causes the formation of a vapor byproduct in said reactor, wherein at least a portion of said vapor byproduct flows upwardly and/or downwardly through said flow passageway as said at least a portion of said reaction medium flows downwardly through said flow passageway.

39. The process of claim 37, wherein each of said trays has a truncated oval shape with said coupling edge defining the curved portion of the truncated oval and said terminal edge defining the truncated portion of the truncated oval.

40. The process of claim 34, wherein said polycondensation feed is introduced into said reactor via a feed inlet located near the top of said reactor, wherein a vapor byproduct of said polycondensation reaction is discharged from said reactor via a vapor outlet located near the top and/or bottom of said reactor, wherein said polycondensation product is recovered from a product outlet located near the bottom of said reactor.

41. The process of claim 34, wherein said polycondensation feed comprises PET having an average chain length in the range of from about 8 to about 40, wherein said polycondensation product comprises PET having an average chain length that is at least about 25 greater than the average chain length of the PET in said polycondensation feed.

42. The process of claim 34, wherein the temperature of said reaction medium in said reactor is maintained in the range of from about 220 to about 350° C., wherein the pressure of said reaction medium in said reactor is maintained in the range of from about 0 to about 30 torr.

43. A reactor comprising: a downwardly sloped tubular member and a plurality of spaced apart trays disposed at different elevations in said tubular member, wherein said tubular member is elongated along a central axis of elongation that is oriented at a downward angle in the range of from about 5 to about 75 degrees below horizontal, wherein each of said trays presents an upwardly facing surface, wherein said upwardly facing surface is sloped less than about 25 degrees from horizontal.

44. The reactor of claim 43, wherein at least one of said trays defines a plurality of apertures extending downwardly therethrough.

45. The reactor of claim 43, wherein at least one of said trays defines a terminal edge that is spaced from the inside wall of said tubular member.

46. The reactor of claim 43, wherein said reactor comprises at least four of said trays.

47. The reactor of claim 43, wherein said tubular member is a substantially straight pipe.

48. The reactor of claim 43, wherein said upwardly facing surface is sloped less than about 5 degrees from horizontal, wherein said downward angle of said tubular member is in the range of from about 10 to about 60 degrees below horizontal.

49. The reactor of claim 43, wherein said upwardly facing surface is substantially planar and substantially horizontal.

50. The reactor of claim 43, wherein said tubular member has a length-to-diameter (L:D) ratio in the range of from about 2:1 to about 50:1.

51. The reactor of claim 50, wherein L is in the range of from about 10 to about 200 feet and D is in the range of from about 1 to about 20 feet.

52. The reactor of claim 43, wherein said tubular member is a substantially straight downwardly sloping pipe, wherein each of said trays is substantially flat and substantially horizontal.

53. The reactor of claim 52, wherein each of said trays presents a coupling edge and a terminal edge, wherein said coupling edge is sealingly coupled to the inside wall of said pipe, wherein said terminal edge is spaced from the inside wall of said pipe to thereby define a flow passageway between said terminal edge and the inside wall of said pipe.

54. The reactor of claim 53, wherein each of said trays has a truncated oval shape with said coupling edge defining the curved portion of the truncated oval and said terminal edge defining the truncated portion of the truncated oval.

55. The reactor of claim 50, wherein each of said trays defines a plurality of apertures extending downwardly therethrough.

56. The reactor of claim 55, wherein said reactor comprises at least four of said trays.

57. The reactor of claim 43, wherein said reactor defines a feed inlet located near the top of said reactor, a vapor outlet located near the top of said reactor, and a product outlet located near the bottom of said reactor.

58. The process of claim 1, wherein said PET in said polycondensation feed has an It.V. in the range of from about 0.1 to about 0.5 dL/g.

59. The process of claim 1, further comprising removing a polycondensation product from a product outlet of said reactor, wherein said reaction medium forms said polycondensation product in said reactor, wherein the It.V. of said PET in said polycondensation product is in the range of from about 0.3 to about 1.2 dL/g.

60. The process of claim 24, further comprising removing a polycondensation product from a product outlet of said reactor, wherein said reaction medium forms said polycondensation product, wherein the It.V. of said PET in said polycondensation product is in the range of from about 0.3 to about 1.2 dL/g.

61. The process of claim 34, wherein the It.V. of said PET in said polycondensation feed is in the range of from about 0.1 and about 0.5 dL/g.

62. The process of claim 34, wherein the It.V. of said PET in said polycondensation product is in the range of from about 0.3 to about 1.2 dL/g.

* * * * *